(12) United States Patent
Jacobson

(10) Patent No.: US 11,399,528 B2
(45) Date of Patent: Aug. 2, 2022

(54) WEARABLE FISHING ROD HOLDER ADAPTED TO BE TILTED, ROTATED, AND ADJUSTED

(71) Applicant: David Jacobson, Janesville, WI (US)

(72) Inventor: David Jacobson, Janesville, WI (US)

(73) Assignee: O'PROS, LLC, Janesville, WI (US)

( * ) Notice: Subject to any disclaimer, the term of this patent is extended or adjusted under 35 U.S.C. 154(b) by 148 days.

(21) Appl. No.: 16/832,523

(22) Filed: Mar. 27, 2020

(65) Prior Publication Data

US 2020/0305404 A1 Oct. 1, 2020

Related U.S. Application Data

(60) Provisional application No. 62/824,683, filed on Mar. 27, 2019.

(51) Int. Cl.
*A01K 97/10* (2006.01)

(52) U.S. Cl.
CPC ..................... *A01K 97/10* (2013.01)

(58) Field of Classification Search
CPC ........................ A01K 97/10; A45F 2005/028
See application file for complete search history.

(56) References Cited

U.S. PATENT DOCUMENTS

| | | |
|---|---|---|
| 3,749,294 A | 7/1973 | Johnston |
| 4,225,106 A * | 9/1980 | Eplan ..................... A45D 20/12 219/242 |
| 4,544,202 A * | 10/1985 | Keaton .................... A47C 3/18 248/425 |
| 4,546,566 A | 10/1985 | Corrente |
| 4,739,914 A | 4/1988 | Pothetes |
| 4,799,610 A * | 1/1989 | Hsieh ....................... A45F 5/00 224/201 |
| 5,123,578 A | 6/1992 | Morse |
| 5,520,312 A | 5/1996 | Maddox |
| 5,573,167 A | 11/1996 | Bebb et al. |
| 5,813,162 A | 9/1998 | Tse et al. |
| 5,881,983 A * | 3/1999 | Hofmann ............... F16M 11/40 248/274.1 |
| 5,913,668 A * | 6/1999 | Messer ................... F41A 23/16 42/94 |
| 5,956,883 A | 9/1999 | Krouth et al. |
| 5,992,717 A | 11/1999 | Clewes et al. |
| 6,003,746 A * | 12/1999 | Richardson ............ A01K 97/10 224/162 |
| 6,185,856 B1 | 2/2001 | Yakabe |
| 6,209,253 B1 | 4/2001 | Saldana, Jr. |
| 6,237,821 B1 | 5/2001 | Owen |

(Continued)

*Primary Examiner* — Timothy D Collins
*Assistant Examiner* — Nicholas Leo Seneczko
(74) *Attorney, Agent, or Firm* — Dunlap Bennett & Ludwig, PLLC

(57) ABSTRACT

A wearable rod holder having a holder portion rotatably connected to a strap clip portion is provided. The strap clip portion engages a strap or a belt a fisherperson may be wearing so that two spaced apart cradle hooks provided by the holder portion may support a fishing pole, hands-free. An elastic cord provided by the holder portion helps secure the fishing rod to the cradle hooks when the fisherperson goes hands-free and/or when rotating the holder portion relative to the strap clip portion to selectively position the fishing rod in a locked engagement with the wearable rod holder.

4 Claims, 4 Drawing Sheets

(56) References Cited

U.S. PATENT DOCUMENTS

| | | | |
|---|---|---|---|
| 6,357,639 B1 | 3/2002 | Williams | |
| 6,591,541 B1* | 7/2003 | Cummings | A01K 97/10 |
| | | | 248/514 |
| 6,591,542 B1 | 7/2003 | Jordan | |
| 6,923,357 B2 | 8/2005 | Smith | |
| 6,974,113 B1* | 12/2005 | Clark | A01K 97/10 |
| | | | 248/521 |
| 7,013,596 B1* | 3/2006 | Moore | A01K 97/06 |
| | | | 224/920 |
| 7,621,066 B1* | 11/2009 | Mathison | A45F 3/10 |
| | | | 43/21.2 |
| 8,151,481 B2* | 4/2012 | Perez, Jr. | A45D 20/14 |
| | | | 34/96 |
| 8,328,055 B1* | 12/2012 | Snyder | A45F 5/00 |
| | | | 224/197 |
| 9,066,596 B2* | 6/2015 | Clark | A47C 3/18 |
| 10,710,510 B2* | 7/2020 | Stephens | B60R 7/14 |
| 11,079,064 B1* | 8/2021 | Cifers | F16M 11/2092 |
| 2009/0084019 A1* | 4/2009 | Carnevali | F16M 11/2078 |
| | | | 43/21.2 |
| 2010/0200628 A1* | 8/2010 | Tages | A45F 5/02 |
| | | | 224/269 |
| 2011/0314722 A1* | 12/2011 | Kemper | A01K 97/10 |
| | | | 43/21.2 |
| 2014/0360086 A1 | 12/2014 | Finlan | |
| 2015/0366180 A1* | 12/2015 | Chmura | F16M 11/18 |
| | | | 248/514 |
| 2016/0037762 A1* | 2/2016 | Thomas | A01K 97/10 |
| | | | 248/636 |
| 2019/0219359 A1* | 7/2019 | Rogers | F41C 33/045 |
| 2019/0269119 A1 | 9/2019 | Vandamia | |

\* cited by examiner

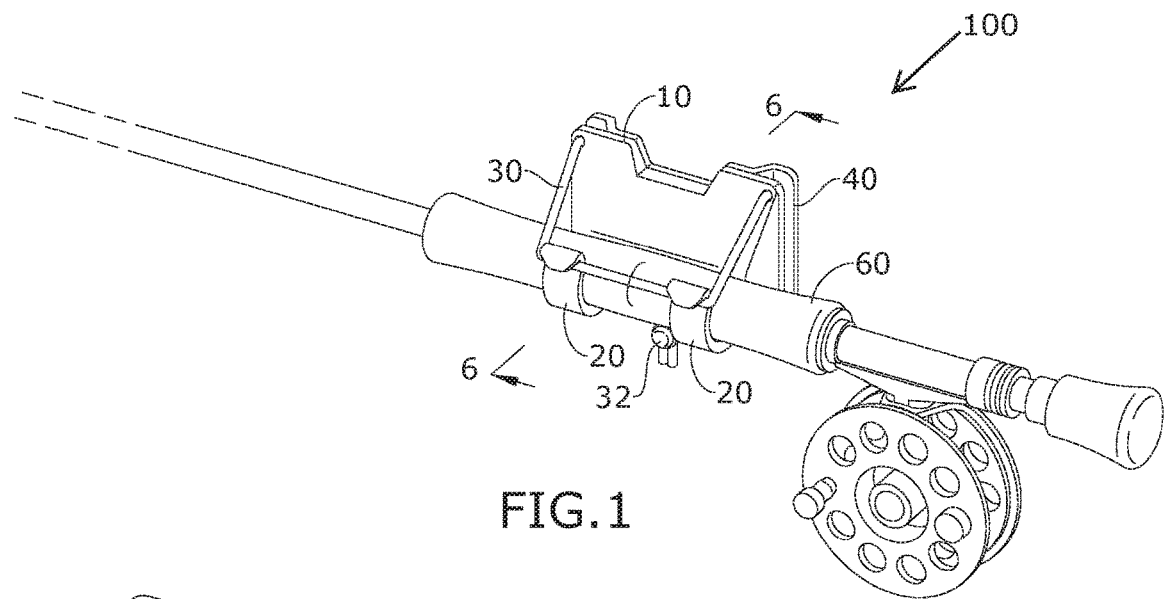
FIG.1
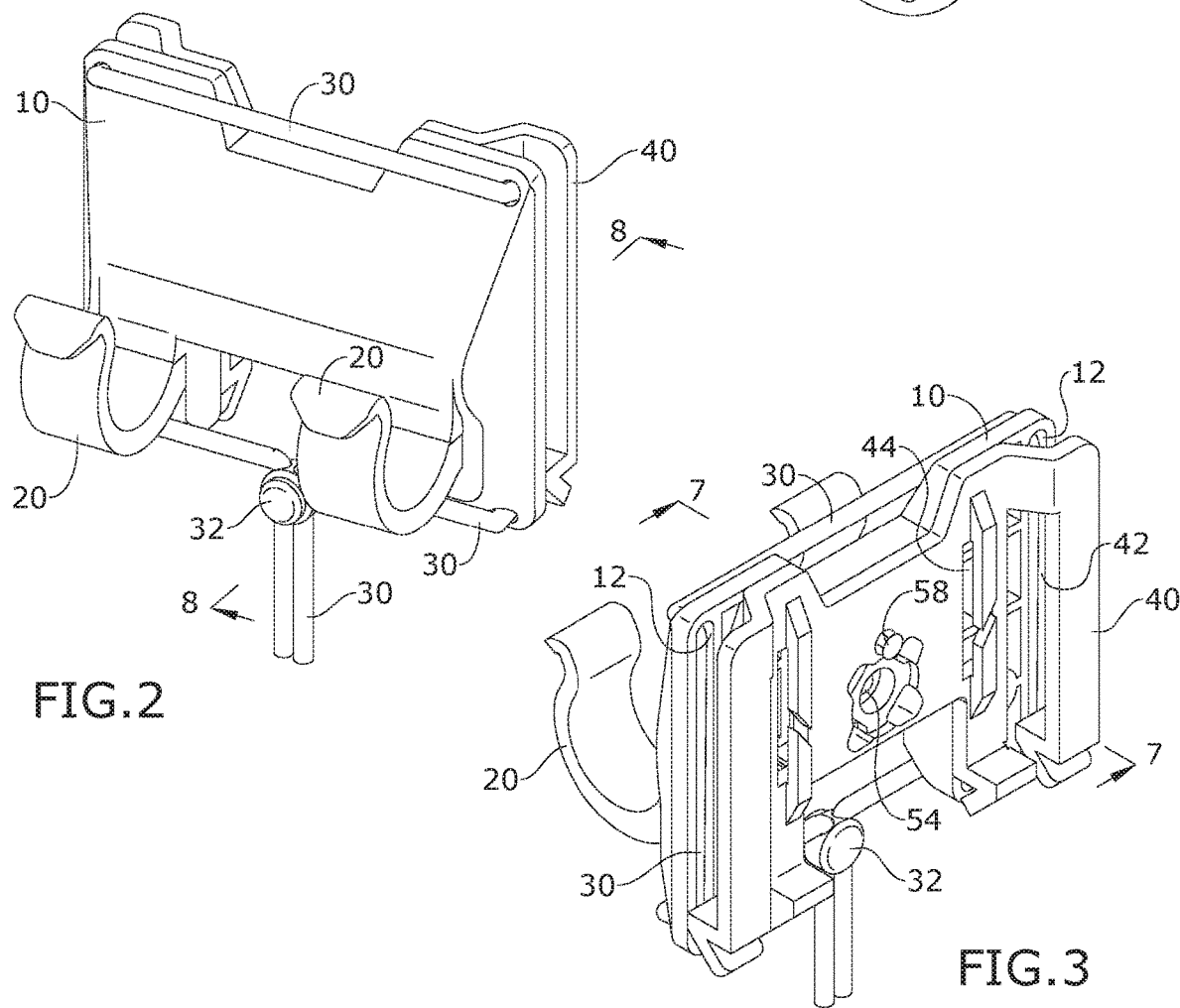
FIG.2
FIG.3

WEARABLE FISHING ROD HOLDER ADAPTED TO BE TILTED, ROTATED, AND ADJUSTED

CROSS-REFERENCE TO RELATED APPLICATION

This application claims the benefit of priority of U.S. provisional application No. 62/824,683, filed 27 Mar. 2019, the contents of which are herein incorporated by reference.

BACKGROUND OF THE INVENTION

The present invention relates to fishing accessories and, more particularly, to a wearable rod holder adapted to be tilted, rotated, and adjusted.

While one is fishing, there are many times they need an extra hand to hold their fishing rod while they manipulate something else; essentially, any time the fisherperson catches a fish, changes lures, or otherwise needs both hands free and there is nowhere to place your fishing rod. Furthermore, when fishing the fisherperson may find themselves in various positions, like standing upright, recumbent, kneeling, resting on their haunches, sitting down in a boat or on a chair on a pier, etc. Thus, the fishing rod position needs to be adjustable in order to accommodate these various positions. In other words, there is not always a one-size-fits-all position and/or orientation for the fishing rod, but rather the fishing rod position must be adjusted to the circumstance.

Other wearable rod holders, unfortunately, are at a fixed position and are not conducive to all applications and circumstances mentioned above. By only allowing the user to hold the fishing rod in one orientation, it is inconvenient, incapable, or uncomfortable at times to perform certain tasks in certain circumstances.

As can be seen, there is a need for a wearable rod holder adapted to be tilted, rotated, and adjusted. The rod holder embodied in the present invention is the only wearable and adjustable fishing rod holder adapted to tilt and rotate. The fishing rod allows a user to quickly become hands-free and/or to selectively rotate a cradled fishing rod 360 degrees and/or selectively position and carry the fishing rod at any angle, in a locked engagement, to keep it securely out of the way.

SUMMARY OF THE INVENTION

In one aspect of the present invention, a wearable fishing rod holder includes the following: a holder portion rotatably connected to a strap clip portion; one or more cradle hooks spaced apart along the holder portion; and an elastic cord provided by the holder portion, whereby the elastic cord can provide tension against an object cradled in one or more cradle hooks and the holder portion.

In another aspect of the present invention, the wearable fishing rod holder further includes a cord cinch stop joining opposing portion of the elastic cord adjacent to the one or more cradle hooks.

In yet another aspect of the present invention, the wearable fishing rod holder further includes a circular flange provided by the strap clip portion; a plurality of gear teeth ridges provided along an inner circumference of the circular flange; and a rotation gear provided along an inward surface of the holder portion, wherein the rotation gear provides a plurality of radial gear teeth dimensioned to operatively associate with said plurality of gear teeth ridges when the holder portion rotates relative to the strap clip portion; one or more rotation protrusions outward of the circular flange; an anchor void sharing an operable radius with the one or more rotation protrusions relative to a center of the circular flange; a plurality of nub slots radially spaced apart along outward of the rotation gear, the plurality of nub slots having said operable radius; and each nub slot dimensioned to successively receive a distal end of one of the one or more rotation protrusion in a nested condition when the holder portion rotates relative to the strap clip portion, whereby the nested condition stops the holder portion from rotating relative to the strap clip portion without further urging; and a locking member slidable through the anchor void and into one of the plurality of nub slots in a locking engagement between the holder portion and the strap clip portion, whereby the holder portion is prevented from rotating relative to the strap clip portion.

These and other features, aspects and advantages of the present invention will become better understood with reference to the following drawings, description and claims.

BRIEF DESCRIPTION OF THE DRAWINGS

FIG. 1 is a perspective view of an exemplary embodiment of the present invention, shown in use;

FIG. 2 is a rear perspective view of an exemplary embodiment of the present invention;

FIG. 3 is a rear perspective view of an exemplary embodiment of the present invention, illustrating locking element 58 in an unlocked engagement;

DETAILED DESCRIPTION OF THE INVENTION

Figure 4:
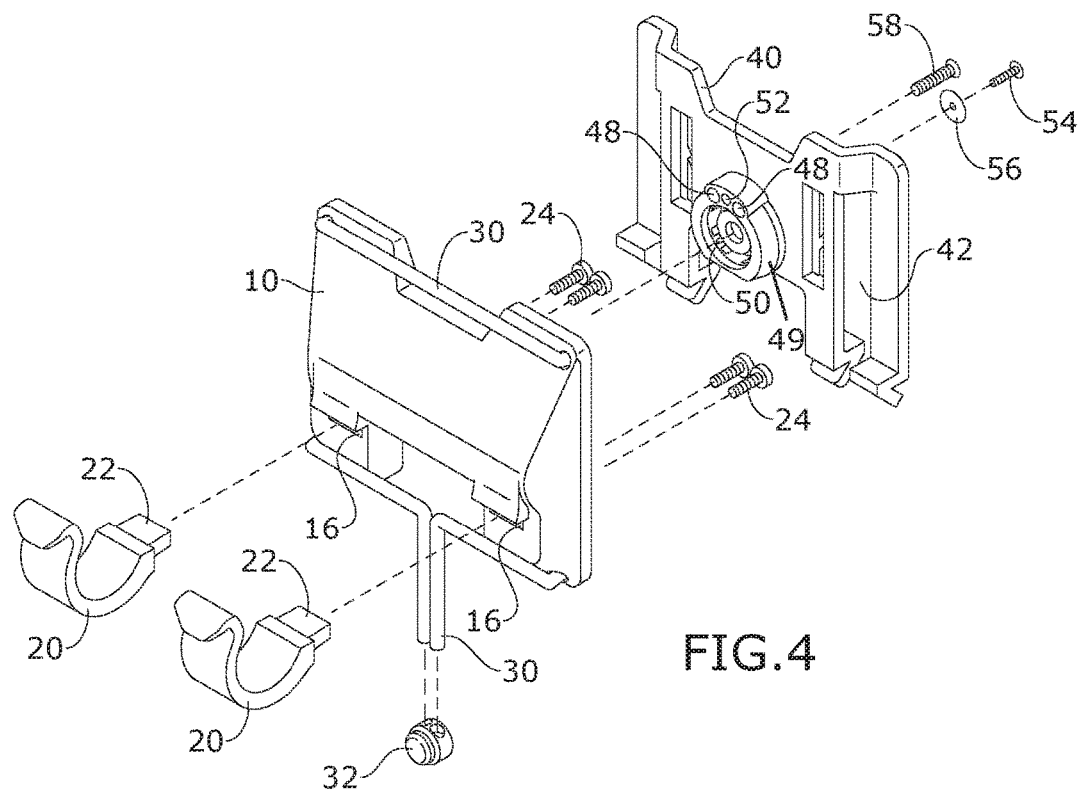
FIG. 4 is a front exploded perspective view of an exemplary embodiment of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a wearable rod holder having a holder portion rotatably connected to a strap clip portion. The strap clip portion engages a strap or a belt a fisherperson may be wearing so that two spaced apart cradle hooks provided by the holder portion may support a fishing pole. An elastic cord provided by the holder portion helps secure the fishing rod to the cradle hooks when the fisherperson goes hands-free and/or when rotating the holder portion relative to the strap clip portion to selectively position the fishing rod in a locked engagement.

Referring to FIGS. 1 through 12, the present invention may include a wearable rod holder 100 having a holder portion 10 rotatably connected to a strap clip portion 40.

The strap clip portion 40 may provide two spaced apart first strap slots 44 disposed inward of two spaced apart second strap slots 42. The second strap slots 42 may be provided along opposing peripheral portions of the strap clip portion 40. The second strap slots 42 may be larger than the first strap slots 44. Each strap slot is dimensioned and adapted to slidably receive a strap or belt therethrough.

Figure 5:
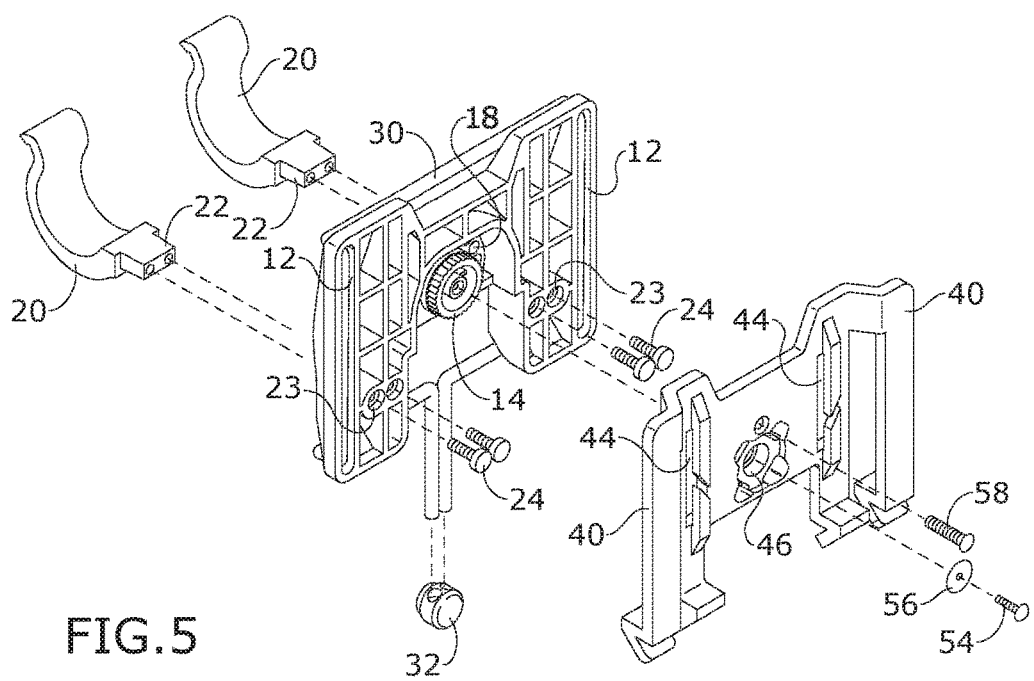
FIG. 5 is a rear exploded perspective view of an exemplary embodiment of the present invention.

The strap clip portion 40 may provide a mounting hole 46 communicating to a cavity defined by a circular flange 49. An inner circumference of the circular flange 49 may provide a plurality of gear teeth ridges 50. Outward of the circular flange 49 may be an anchor void 52 dimensioned and adapted to receive a locking member 58. Also outward of the circular flange 49 may be one or more rotation protrusions 48. The one or more rotation protrusions 48 and the anchor void 52 may share an operable radius about the mounting hole 46. A mounting fastener 54 may be dimensioned and adapted to slidably engage the mounting hole 46 and a mounting hole of the holder portion 10, as illustrated in FIG. 5, so as to rotatably connect the holder portion 10 to the strap clip portion 40. A washer 56 may be associated with the mounting fastener 54.

Said mounting hole of the holder portion 10 may be disposed in a center of a rotation gear 14 having radial gear teeth dimensioned and adapted to operatively associate with said plurality of gear teeth ridges 50 when the holder portion 10 rotates relative to the strap clip portion 40. Outward of the rotation gear 14 and radially spaced apart there along may be a plurality of nub slots 18 also having said operable radius relative to the mounting hole of the holder portion 10. Each nub slot 18 may be dimensioned and adapted to operatively associate with either a rotation protrusion 48 or the locking member 58. The distal ends of the rotation protrusions 48 nest into the nub slot 18 in a nested condition (illustrated in FIGS. 7 and 9). When there are two rotation protrusions 48, each rotation protrusion 48 can be nested in a spaced apart nub slot. Such nested conditions provide friction to stop the holder portion 10 in certain selected positions. Furthermore, the dual nested condition enables calibrating, controlling, and equally dividing the 360-degrees of rotation in a plurality of equally spaced segments. Additionally, such nested conditions help to maintain centricity of the rotation gear 14 relative the cavity defined by a circular flange 49 when the holder portion 10 rotates relative to the strap clip portion 40.

When not in the nested condition, the distal end of the rotation protrusion(s) 48, against the surface surrounding the plurality of nub slots 18, forces an upper portion of the holder portion 10 (pursuant the embodiment illustrated in the FIGS.) away from the strap clip portion 40 in a tilted condition, if the user so chooses.

Figure 6:
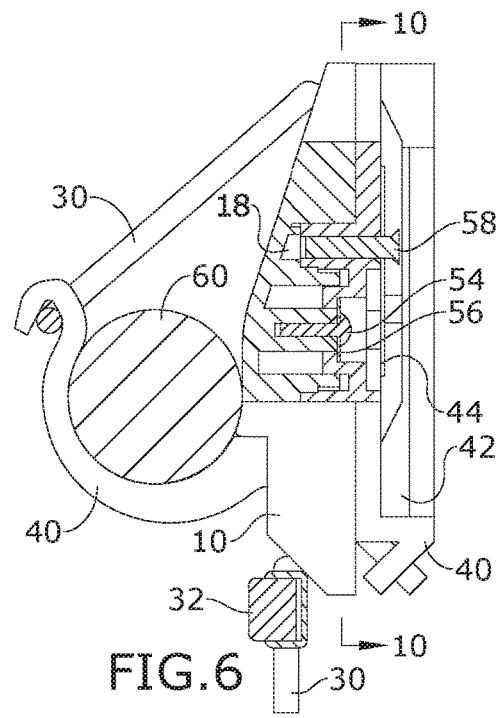
FIG. 6 is a section view of an exemplary embodiment of the present invention, taken along line 6-6 in FIG. 1.
Figure 7:
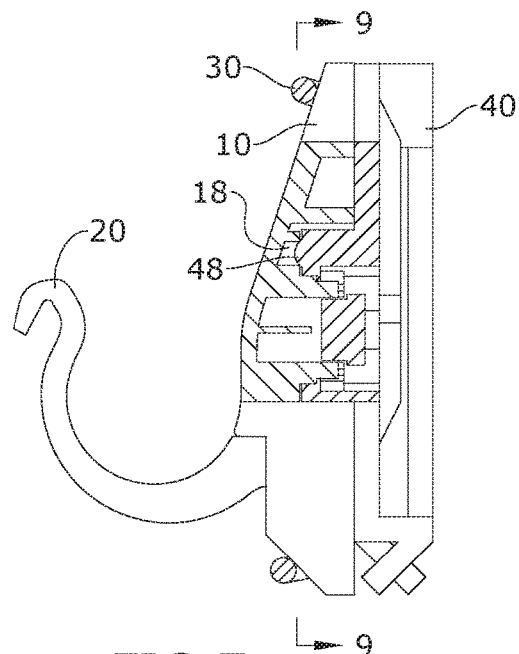
FIG. 7 is a section view of an exemplary embodiment of the present invention, taken along line 7-7 in FIG. 3.
Figure 8:
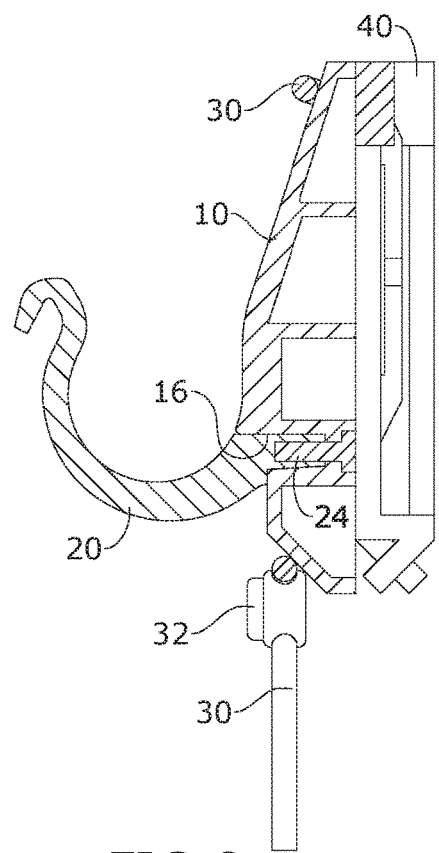
FIG. 8 is a section view of an exemplary embodiment of the present invention, taken along line 8-8 in FIG. 2.
Figure 9:
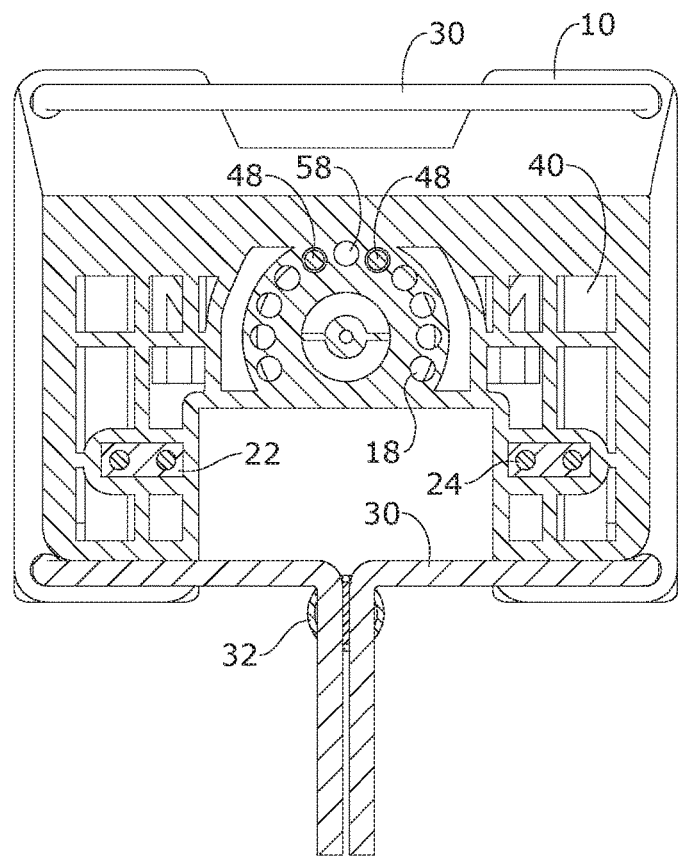
FIG. 9 is a section view of an exemplary embodiment of the present invention, taken along line 9-9 in FIG. 7.
Figure 10:
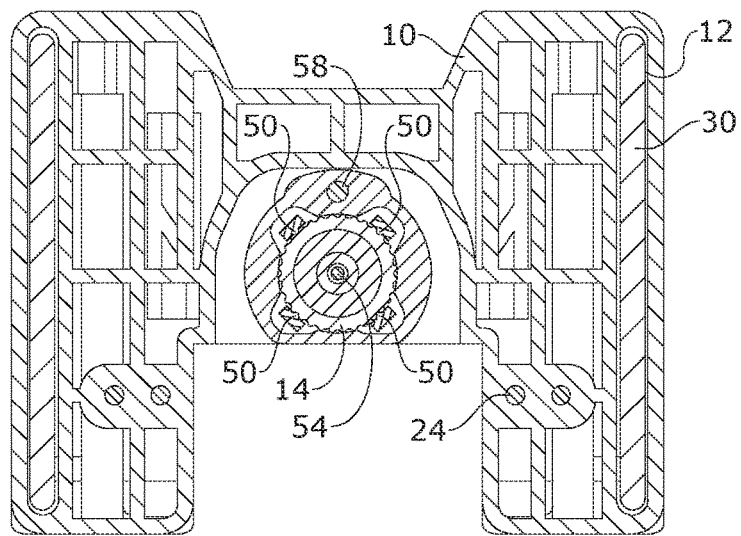
FIG. 10 is a section view of an exemplary embodiment of the present invention, taken along line 10-10 in FIG. 6.
Figure 11:
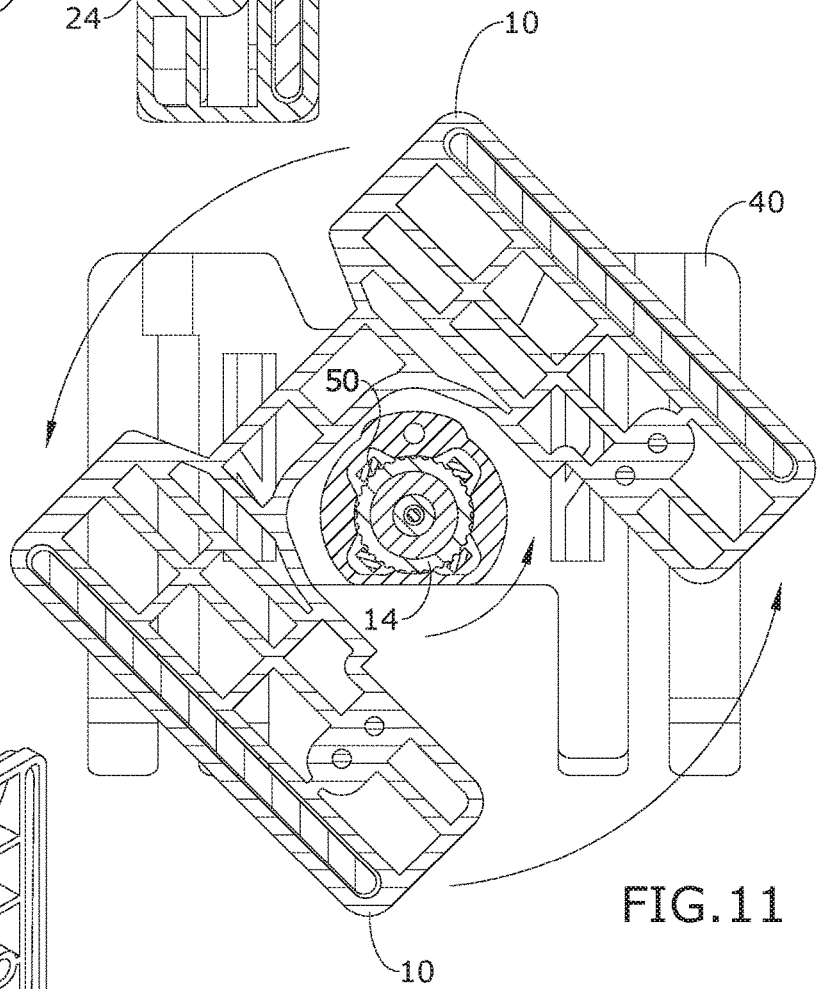
FIG. 11 is a section view of an exemplary embodiment of the present invention, illustrating rotation of holder portion 10 about the strap clip portion 40.
Figure 12:
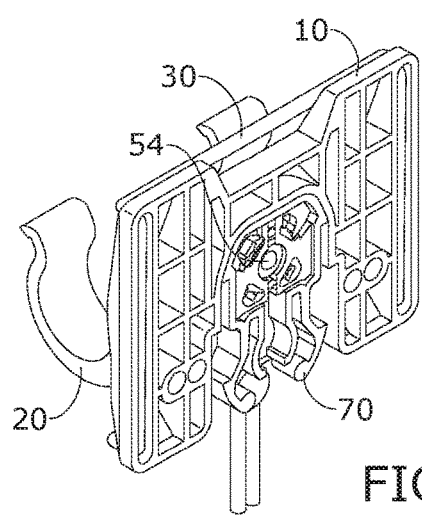
FIG. 12 is a rear perspective view of an exemplary embodiment of the present invention, illustrating how the strap clip portion 40 can be removed and replaced with an action camera quick-release mount 70, enabling the holder portion 10 to be mounted to quick release action camera mounts on raft frames, boats, backpacks, any flat surface or suction to a car etc.

When one of the nub slots 18 receives the locking member 58 the holder portion 10 is locked relative to the strap clip portion 40 in a locked engagement; otherwise the holder portion 10 and the strap clip portion 40 are in an unlocked engagement, as illustrated in FIGS. 3 and 6.

An outward surface of the holder portion 10, opposite the surface which engages the strap clip portion 40, may provide two spaced apart cradle hooks 20. Each cradle hook 20 provides a post 22 at a proximal end for connecting to said outward surface by way of hook slots 16 and connecting fasteners 24 through associated fastener holes 23. The cradle hooks 20 are dimensioned and adapted to support the elongated pole 60 of a fishing rod, as illustrated in FIG. 1, as well as other elongated members.

Inward of opposing sides of the holder portion 10 cord slots 12 may be provided to receive an elastic cord 30 so that the elastic cord 30 spans the periphery of the holder portion 10 and is supported along or adjacent to each vertex thereof. A cord cinch stop 32 may join opposed ends of the elastic cord 30 in a cinched position along a lower portion of the holder portion 10, adjacent and between the two spaced apart cradle hooks 20.

A method of using the present invention may include the following. The wearable rod holder 100 disclosed above may be provided. The wearable rod holder 100 may be clipped onto a belt or strap by way of the strap clip portion 40 and thus be accessible to cradle a fishing rod 60 in the cradle hooks 20. Then the user is enabled the tilt or rotate the angle of the fishing rod to their liking by way of rotating the holder portion 10 relative to the strap clip portion 40. The cradle hooks 20 securely hold the fishing rod 60 as the elastic cord 30 can be placed over the fishing rod 60 to lock it into place, so that the user can go "hands-free". To wit, the cord cinch stop 32 enables the user to keep tension on the elastic cord 30 in the cinched position.

Additionally, the wearable rod holder 100 can also be used to hold and carry a fishing net or any other object having an elongated member/handle.

It should be understood, of course, that the foregoing relates to exemplary embodiments of the invention and that modifications may be made without departing from the spirit and scope of the invention as set forth in the following claims.

What is claimed is:
1. A wearable fishing rod holder, comprising:
a holder portion rotatably connected to a strap clip portion;
one or more cradle hooks spaced apart along an outward surface the holder portion;
an elastic cord provided by the holder portion;
a circular flange provided by the strap clip portion;
a plurality of gear teeth ridges provided along an inner circumference of the circular flange;
a rotation gear provided along an inward surface of the holder portion, wherein the rotation gear provides a plurality of radial gear teeth dimensioned to operatively associate with said plurality of gear teeth ridges when the holder portion rotates relative to the strap clip portion;
one or more rotation protrusions outward of the circular flange;
an anchor void sharing an operable radius with the one or more rotation protrusions relative to a center of the circular flange;
a plurality of nub slots radially spaced apart along outward of the rotation gear, the plurality of nub slots having said operable radius; and
each nub slot dimensioned to successively receive a distal end of one of the one or more rotation protrusion in a nested condition when the holder portion rotates relative to the strap clip portion, whereby the nested condition stops the holder portion from rotating relative to the strap clip portion without further urging, and whereby the elastic cord can provide tension against an object cradled in one or more cradle hooks and the holder portion.

2. The wearable fishing rod holder of claim 1, further comprising a cord cinch stop joining opposing portion of the elastic cord adjacent to the one or more cradle hooks.

3. The wearable fishing rod holder of claim 1, further comprising:

two spaced apart first strap slots disposed inward of two spaced apart second strap slots; and the two second strap slots provided along opposing peripheral portions of the strap clip portion.

4. The wearable fishing rod holder of claim 1, further comprising:

a locking member slidable through the anchor void and into one of the plurality of nub slots in a locking engagement between the holder portion and the strap clip portion, whereby the holder portion is prevented from rotating relative to the strap clip portion.

\* \* \* \* \*